Dec. 6, 1938. M. L. HAMLIN 2,139,015
REVERSIBLE DUTCH LAP SHINGLE
Filed July 21, 1936 3 Sheets-Sheet 1
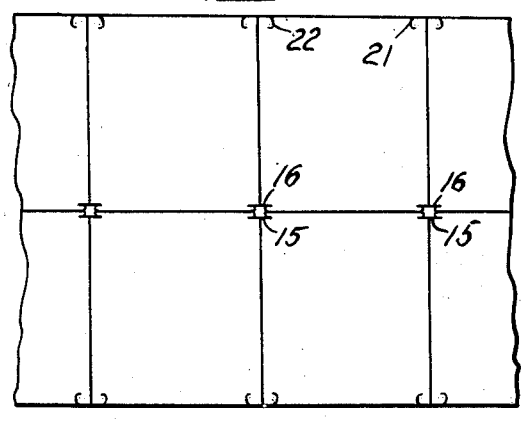
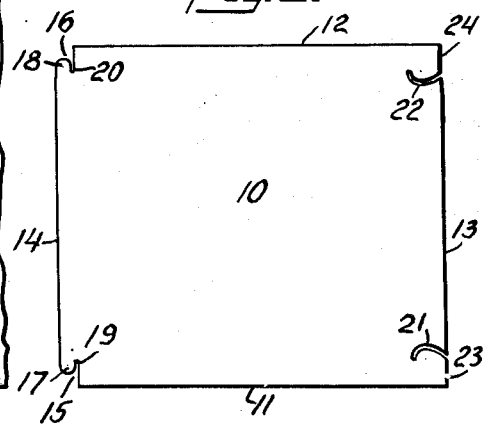
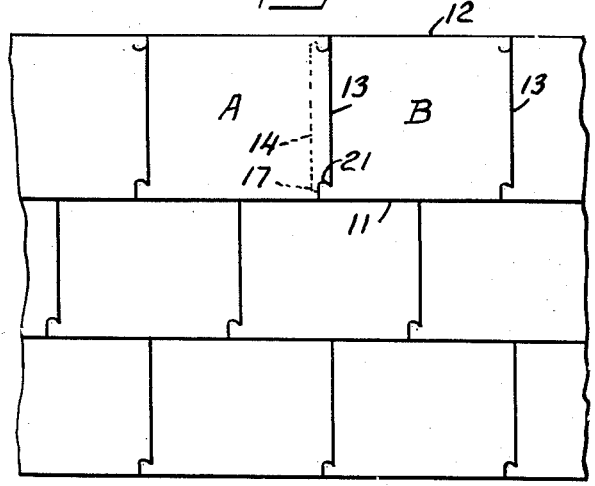
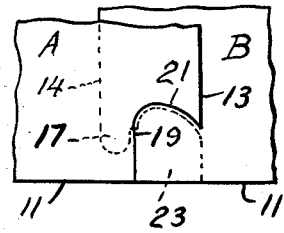
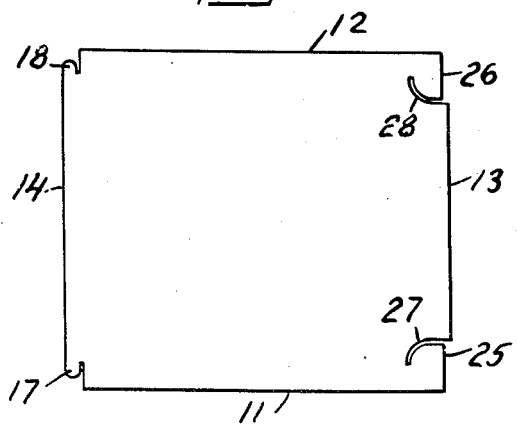
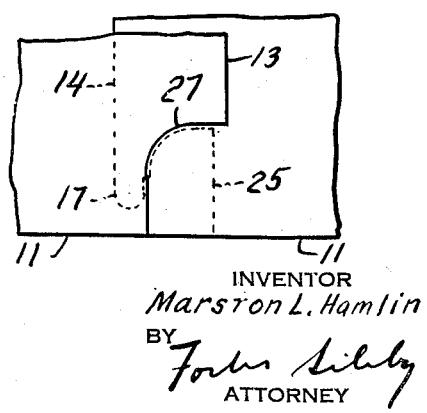
INVENTOR
Marston L. Hamlin
BY
ATTORNEY Dec. 6, 1938.　　　M. L. HAMLIN　　　2,139,015
REVERSIBLE DUTCH LAP SHINGLE
Filed July 21, 1936　　　3 Sheets-Sheet 2
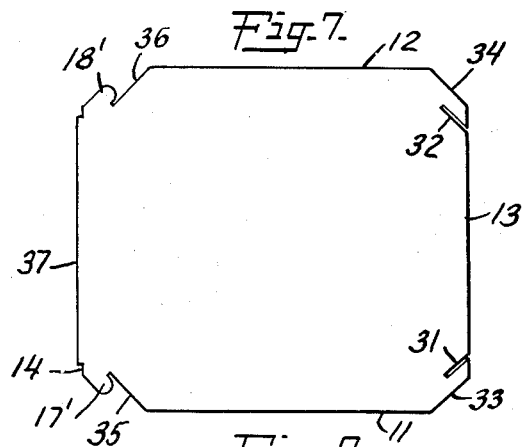
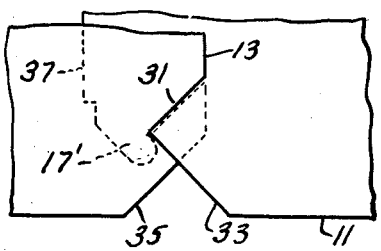
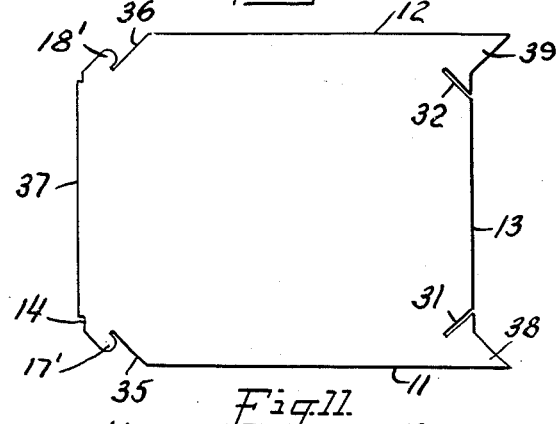
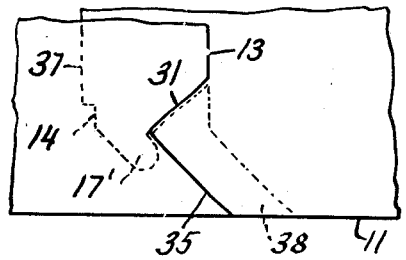
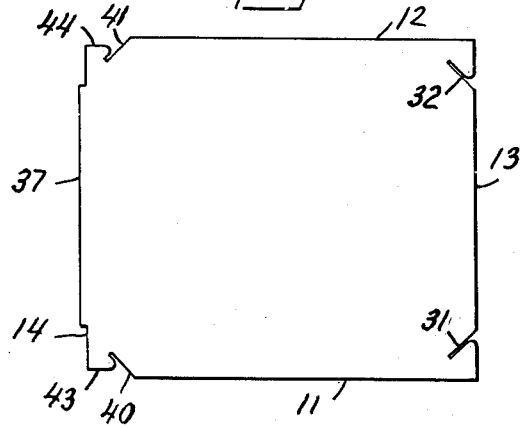
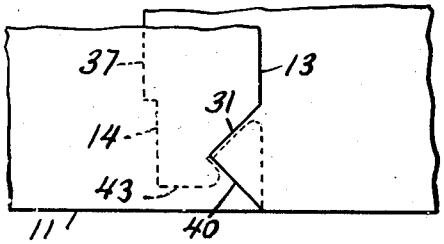
INVENTOR
Marston L. Hamlin
BY
ATTORNEY Dec. 6, 1938.  M. L. HAMLIN  2,139,015
REVERSIBLE DUTCH LAP SHINGLE
Filed July 21, 1936   3 Sheets-Sheet 3
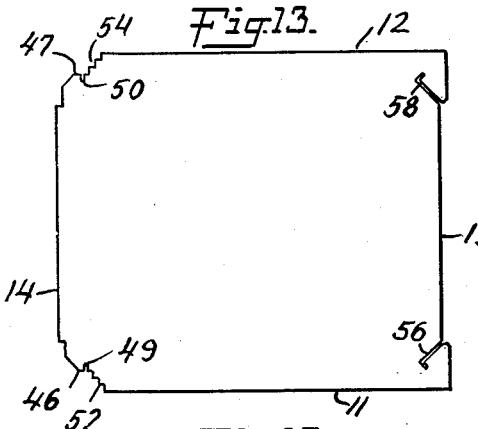
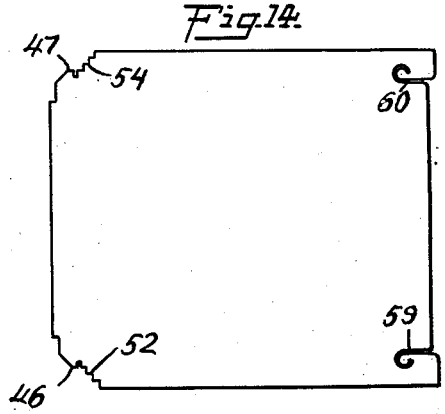
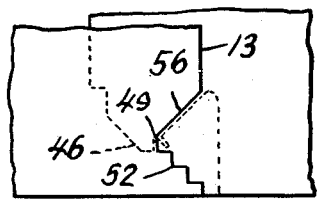
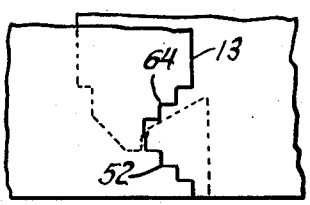
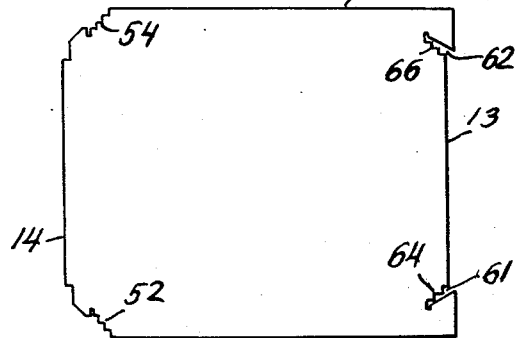
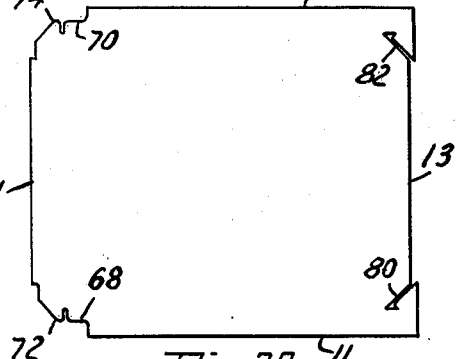
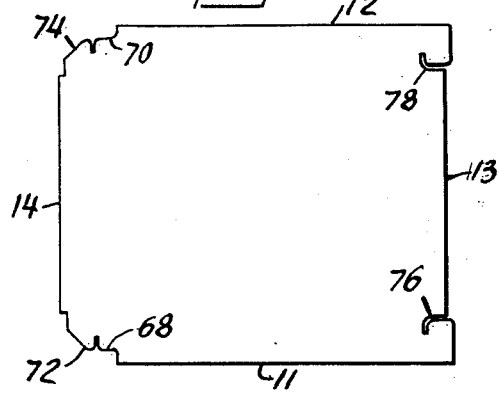
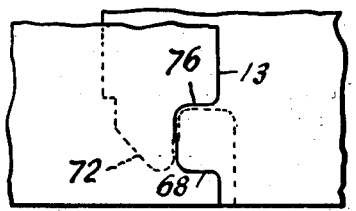
INVENTOR
Marston L. Hamlin
BY
ATTORNEY Patented Dec. 6, 1938

2,139,015

UNITED STATES PATENT OFFICE 2,139,015

REVERSIBLE DUTCH LAP SHINGLE

Marston L. Hamlin, Lynbrook, N. Y., assignor to The Barrett Company, New York, N. Y., a corporation of New Jersey Application July 21, 1936, Serial No. 91,695

3 Claims. (Cl. 108—7)

This invention relates to shingles and more particularly to flexible shingles of the interlocking type.

One object of this invention is to provide a reversible shingle which may be laid in courses in alignment with other like shingles and which may be interlocked with adjacent shingles so that the exposed portions of the shingles resist ripping up or flapping by the wind.

Another object of this invention is to provide a reversible interlocking shingle which may be cut without waste from a roofing sheet and which is economical to manufacture and easy to apply.

The shingle of this invention comprises a body portion of general rectangular form bounded by a longitudinal edge to be exposed, a longitudinal edge to be covered by shingles of an overlapping course, and by transverse edges connecting the longitudinal edges. The shingle is provided along one of the transverse edges with two locking members, the free end of one of which is directed toward one of the longitudinal edges, and the free end of the other is directed toward the other longitudinal edge. Both of the locking members lie entirely within the rectangular outline of the shingle, and the entire area of each is positioned between the longitudinal edge toward which it is directed and the longitudinal axis of the shingle. The shingle is provided with locking openings preferably in the form of slits or slots extending inwardly from the opposite transverse edge of the shingle in the neighborhood of each of the longitudinal edges thereof, each opening having a general trend toward the longitudinal edge to which it is adjacent. The shingles are laid in overlapping courses with one longitudinal edge exposed and the other longitudinal edge covered by shingles of the succeeding course. The locking member adjacent the exposed longitudinal edge of each shingle extends through and interlocks with the locking opening adjacent the exposed longitudinal edge of a contiguous shingle in the same course to secure the shingles together with their exposed edges in alignment. If desired for any reason, for example, if a longitudinal edge of the shingles has become damaged, or it is preferred to lay alternate courses in a direction from right to left and left to right, respectively, the shingles may be reversed and laid with the other longitudinal edge exposed.

For a more detailed description of the invention, reference is made to the accompanying drawings which are illustrative of preferred embodiments of the invention and are not intended to limit the scope of the invention to the embodiments shown.

In the drawings,

Fig. 1 is a plan view of cutting layout illustrating how one form of the shingles of this invention may be cut from a roofing sheet;

Fig. 2 is a plan view of an individual shingle constructed in accordance with my invention;

Fig. 3 is a fragmentary enlarged plan view illustrating two shingles such as shown in Fig. 2 in interlocked relation;

Fig. 4 is a plan view of a roof formed by laying the shingles illustrated in Figs. 1, 2, and 3;

Fig. 5 is a plan view illustrating a modified form of shingle constructed in accordance with this invention;

Fig. 6 is an enlarged fragmentary view illustrating the manner in which two shingles such as shown in Fig. 5 may be locked together;

Fig. 7 is a plan view of another modified form of shingle;

Fig. 8 is a fragmentary view illustrating the manner in which two similar shingles such as shown in Fig. 7 may be locked together;

Fig. 9 is a plan view of another modified form of a shingle constructed in accordance with this invention;

Fig. 10 is a fragmentary view illustrating two shingles of Fig. 9 locked together;

Fig. 11 is a plan view of another modified form of shingle constructed in accordance with this invention;

Fig. 12 is a fragmentary view illustrating how the shingles of Fig. 11 may be locked together;

Figs. 13, 14, 16, 18, and 19 are plan views of further modifications of shingles constructed in accordance with my invention; and Figs. 15, 17, and 20 are enlarged fragmentary views showing shingles of Figs. 13, 16, and 18, respectively, in interlocked relation.

Referring more particularly to Fig. 2, it will be seen that the shingle here illustrated comprises a body portion 10 of general rectangular form bounded by forward and rear edges 11 and 12 and by transverse edges 13 and 14 connecting the edges 11 and 12. Transverse edge 14 of the shingle is provided adjacent the corners thereof with cutaway portions 15, 16 defining oppositely projecting locking members 17, 18 having their inner side portions separated from the remainder of the shingle by the relatively short slots 19, 20.

The opposite transverse edge of the shingle is provided with locking slits 21, 22 extending inwardly from said edge. The inner portions of these slits extend outwardly toward the edges 11 and 12 of the shingle, respectively, forming members 23, 24 deflectable from the plane of the shingle, and the inner ends of the slits are positioned substantially the same distance from the edges 11 and 12 of the shingle as the closed ends of the slots 19, 20 for a purpose which will appear hereinafter.

The shingles of Fig. 2 may be laid in interlocked relation in the manner illustrated in Fig. 3 to form a roof covering composed of overlapping and underlapping courses of interlocked shingles as shown in Fig. 4. In order to lay the shingles, the portion 23 of overlying shingle A may be bent inwardly from the plane of the remainder of the shingle body and the inner end of the slit 21 of the shingle engaged with the inner end of the slit 19 of underlying shingle B. As hereinabove pointed out, the closed ends of slits 19 and 21 are positioned the same distance from the edge 11 of the shingles so that when the inner ends of the respective slits of adjacent shingles are engaged, the exposed edges of the shingles will be in alignment. The downwardly directed locking member 17 of shingle B cooperates with the downwardly directed side edge of the locking slit 21 of shingle A to provide an interlock such that the exposed edges of the shingles cannot be blown or ripped up by the wind without tearing the shingle body.

If for any reason it is desired to lay the shingles with the edges 12 exposed and the edges 13 on the left instead of on the right, the shingles may be turned through an angle of 180°, whereupon the member 18 becomes the downwardly directed locking member and locks with slit 22 of an adjacent shingle. After each course of shingles is laid, the next course is laid in overlapping relation to the preceding course. If it is desired to produce a roof of variegated design, alternate courses of shingles may be laid with the edges 12 exposed and the intervening courses with the edges 11 exposed.

The shingles may be cut from a roofing sheet by the procedure illustrated in Fig. 1. Slits 21, 22 are formed by suitably cutting the longitudinal edges of the sheet, and the locking members 15, 16 are defined by cutouts within the body of the sheet. The sheet may be separated into individual shingle elements by a longitudinal cut and transverse cuts extending through the cutouts. The roofing sheet may advantageously be constituted of a felt base impregnated and coated with waterproofing material, for example, asphalt and a layer of granular material partially embedded in the coating material.

In Figs. 5 and 6, there is disclosed a modification of the shingle of Fig. 2 provided with cutouts 25, 26 extending from the outer portions of the locking slits 27, 28 toward the edges 11 and 12, respectively, of the shingle. The locking slits 27, 28 of the shingle shown in Fig. 5 extend substantially horizontally from the transverse edge of the shingle and the inner portions of the slits extend respectively toward the edges 11 and 12.

Figs. 7 and 8 disclose a shingle which differs from the shingles of Figs. 1 and 6 chiefly in that straight locking slits 31, 32 extending from transverse edge 13, instead of curved slits, are provided and in that the shingle is cut away adjacent the corners thereof, as indicated by reference numerals 33, 34, 35, 36. The cutaway portions of adjacent shingles cooperate to form V-shaped cutouts 36 between the shingles when the latter are laid. By this means, the courses of shingles do not present an unbroken line and hence may be employed to lend an enhanced decorative appearance to the roof. The locking members 17′, 18′ extend at an inclination to the edges 11 and 12 and interlock with the slots 31, 32 of an adjacent shingle as illustrated in Fig. 8.

The shingles of Figs. 7 and 8 are also provided with extensions 37 which may be employed as aligning guides for properly aligning the shingles of a course being laid with respect to the shingles of the preceding course. These extensions, while shown as extending from the edge 14 of the shingle may extend from either the edge 13 or the edge 14.

The shingle of Figs. 9 and 10 when laid gives a further variation in the design of the roof without sacrificing the protection afforded by any of the overlapping portion of a course of shingles. In this figure, projections 38, 39 extending laterally from the transverse edge 13 of the shingle fill the space, when the shingles are laid, formed by the cutaway portions 35, 36 of an adjacent shingle. As shown in Fig. 10, the exposed lines of juncture between the interlocked portions of adjacent shingles is of the shape of a horizontal V having one leg longer than the other.

The shingle shown in Figs. 11 and 12 provides a still different pattern when laid. As shown in Fig. 12, this shingle may be laid in interlocking relation with an adjacent shingle with the locking member 43 (or 44) locking with slot 31 (or 32) of the adjacent shingle. The slots 31, 32 and short edge portions 40, 41 are of such proportions that the exposed lines of juncture between the interlocked portions of adjacent shingles form a design having the shape of a symmetrical horizontal V.

In Figs. 13 and 15 are disclosed shingles having locking members 46, 47 extending respectively toward edges 11, 12 and partially separated from the remainder of the shingle body by slots 49, 50. Stepped edge portions 52, 54 are provided adjacent the locking members. These stepped portions, when the shingles are laid, form a stepped design adjacent the lower edge of each course of shingles. For example, the shingle of Fig. 13 may be laid with the projection 46 and slot 49 interlocking with the angular slot 56 of an adjacent shingle to form the design shown in Fig. 15.

The shingle of Fig. 14 differs from that of Fig. 13 chiefly in that the locking slits 59, 60 of the shingle of Fig. 14 are of curved configuration. This shingle when laid forms a design having a stepped portion like the design shown in Fig. 15, but differing from the design of this figure in that the exposed edge of slot 59 or 60 is curved instead of straight.

The shingle of Fig. 16 differs from that of Fig. 13 in that the edge to be exposed of each of the locking slots 61, 62 is of stepped instead of straight configuration. The shingle may be laid to form the design shown in Fig. 17 having the stepped portions 52 and 64 of adjacent shingles in diverging relationship.

The modified shingles shown in Figs. 18 and 19 are provided with curved edge portions 68, 70 adjacent the locking projections 72, 74. The shingle of Fig. 18 is provided with curved locking openings 76, 78 adjacent the edge 13, whereas the corresponding locking openings 80, 82 of the shingle of Fig. 19 are of angular configuration. The shingle of Fig. 18 may be laid with another similar shingle to form the design shown in Fig. 20 in which the curved edge 68 and the curved edge of slot 76 are exposed. The shingle of Fig. 19 when laid forms a design differing from that formed by the shingle of Fig. 18 in that the locking opening 80 presents an exposed straight instead of a curved edge.

It will be noted that I have provided a reversible shingle which is symmetrical about its longitudinal median line, i. e., the locking projections are associated with the top and bottom of one side edge and the locking slots or other openings with the top and bottom of the other side edge. Hence, the shingle can be readily laid on a roof, wall or other surface from right to left or left to right, depending upon which longitudinal edge is exposed to the weather. Moreover, in the shingles of this invention the locking projections and recesses are confined within the border edges of the elements, facilitating packaging, since, irrespective of which longitudinal edge is disposed in the bundle or package to constitute the lower edge thereof, no projecting portions occur. It will also be noted that the locking projections and recesses are constructed and arranged so that the projections can readily be placed in locking engagement with the recesses. That is to say, irrespective of which longitudinal edge of the shingle is exposed to the weather, a downwardly directed locking slot is provided for engagement by a locking projection which also extends generally downwardly from the body of the shingle, terminating short of the longitudinal edge, and is of a tapering shape so that it can readily be locked with the locking recess of a contiguous shingle.

I claim:

1. An interlocking reversible shingle adapted to be laid in courses in underlapping and overlapping relationship with adjacent shingles of the same course, said shingle comprising a body portion of general rectangular form bounded by forward and rear edges and transverse edges connecting said forward and rear edges, said shingle being provided on one of its transverse edges with two locking members, one near each end of the transverse edge, the member near the forward edge being positioned wholly above said forward edge and that near the upper edge being positioned below the upper edge, both of said members lying substantially entirely within the rectangular outline of said body portion, and cutaway portions between said locking members and said upper and forward edges, said shingle being provided adjacent its opposite transverse edge with locking openings extending inwardly from said opposite transverse edge, the inner edge of a locking member of said shingle being adapted to interlock with an inner edge of the locking opening of an adjacent shingle to secure said shingles together, said cutaway portions facilitating interlocking the locking members with the locking openings of other like shingles.

2. A reversible interlocking felt base shingle comprising a body portion of general rectangular shape having two longitudinal edges, either of which is adapted to be exposed to the weather, and transverse edges, said shingle being provided on one of said transverse edges with locking members extending toward but terminating inwardly of said longitudinal edges, the outer ends and inner sides of said locking members being defined by cutaway portions and inwardly directed substantially straight slots respectively, whereby the inner sides of said locking members are straight throughout substantially their entire length, the other transverse edge of said shingle being provided with locking openings extending inwardly therefrom and outwardly toward said longitudinal edges, said shingle being adapted to be laid in courses with other like shingles with the inner edge of one of said locking members interlocking with an inner edge of a locking opening of an adjacent shingle of the same course and with a locking opening of said shingle receiving a locking member of another adjacent shingle of the same course.

3. A reversible interlocking felt base shingle comprising a body of general rectangular shape having two longitudinal edges, either of which is adapted to be exposed to the weather, and transverse edges, said shingle being provided on one of said transverse edges with locking members extending substantially perpendicularly toward but terminating inwardly of said longitudinal edges, the outer ends of said locking members being rounded and defined by cutaway portions adjacent the longitudinal edges, the inner sides of said locking members being straight throughout substantially their entire length and defined by inwardly directed slots substantially parallel to said transverse edges whereby the inner ends of said locking members are of a width at least as great as the remainder thereof, said shingle being provided adjacent the other transverse edge with locking openings each extending inwardly therefrom and outwardly toward one of said longitudinal edges, the upper end of the inner edge of the locking member adjacent one of the longitudinal edges of one shingle being adapted, when the shingles are laid, to interlock with the inner end of the locking opening of an adjacent shingle in the same course to lock the shingles together with their exposed edges in alignment.

MARSTON L. HAMLIN.